United States Patent Office 3,483,660
Patented Dec. 16, 1969

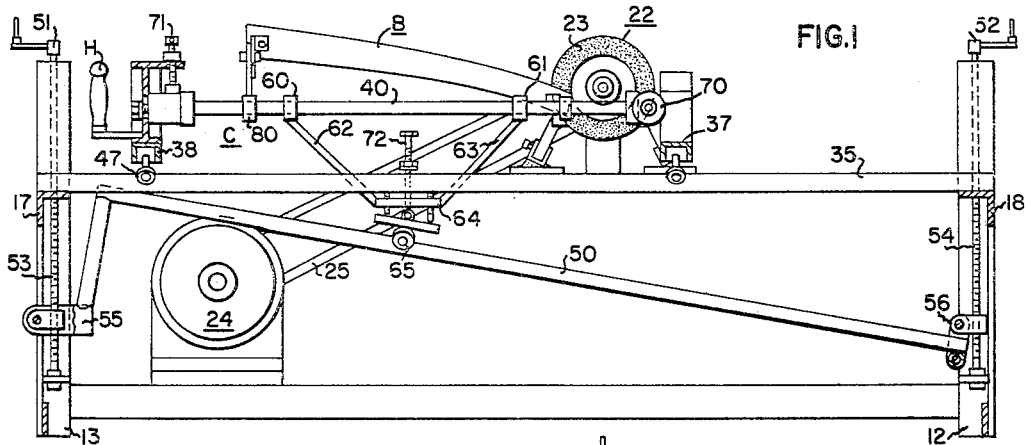
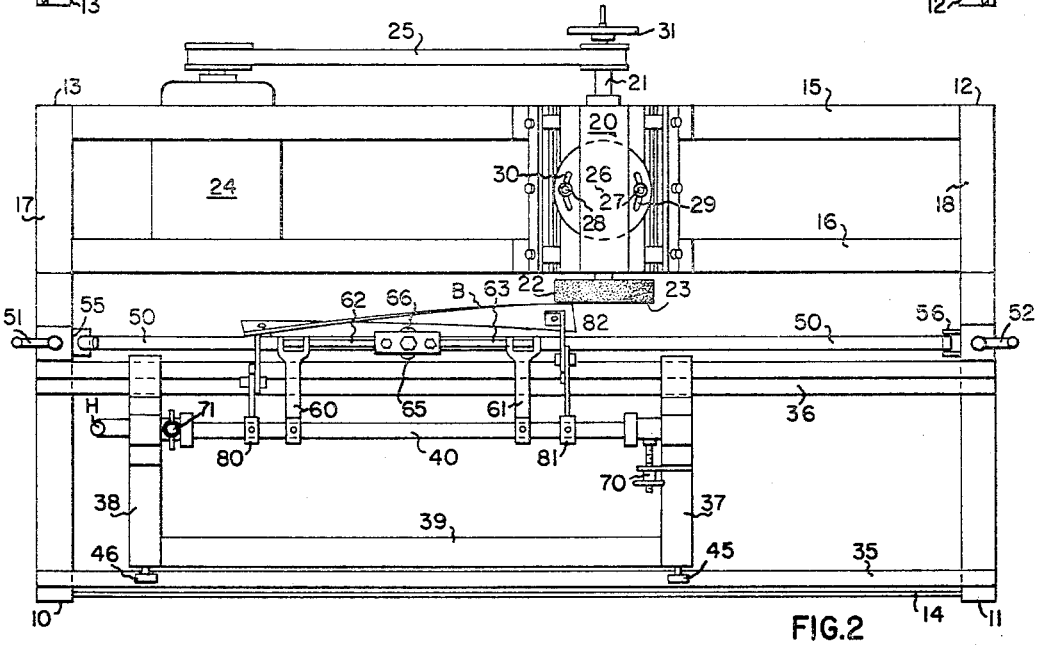
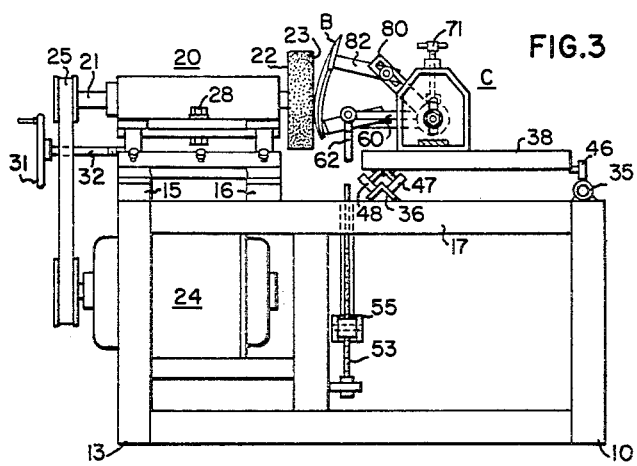

3,483,660
GRINDING MACHINE FOR ARCUATE
SHAPED BLADES
Charles G. Harris, 1301 Orange Road,
Culpeper, Va. 22701
Filed Mar. 13, 1967, Ser. No. 622,614
Int. Cl. B24b *3/36, 5/00, 47/02*
U.S. Cl. 51—123                    6 Claims

ABSTRACT OF THE DISCLOSURE

A carriage movable relative to a grinding surface has a blade support pivotally mounted on an axis aligned with its path of movement and cam follower means between the pivotal blade support and a straight inclined cam surface along the movement path of the carriage causes the blade support to pivot as it moves past the grinding surface to maintain a desired grinding angle for an arcuate shaped blade fixed to the blade support.

BACKGROUND OF THE INVENTION

Harvesting machines of the various kinds now in use are provided with rotatable bladed cutting units which are usually formed of arcuate shaped blade segments. In order to sharpen or true the cutting surfaces of the blades of a harvesting machine, it is customary to remove each arcuate blade segment and grind the blade edge to the desired form. Machines for precisely grinding the form of an arcuate blade cutting surface are of course well known but prior to this invention such machines were relatively complex in that elaborate cam follower mechanisms were provided to maintain a desired grinding angle as the arcuate blade is moved lengthwise past the grinding surface. Different types and sizes of harvesting machines have blades units formed with different helix angles and it is, therefore, required that a grinding machine for the arcuate blade segments be easily and simply adjustable to track different types of arcuate shaped blades and it is particularly desirable that the cam follower arrangement be as simple as possible and that a single simple cam track be usable for a large variety of different sizes nd blade angles of arcuate blades to be sharpened.

PRIOR ART

A typical example of the prior art known to applicant is shown by the following listed patent which is classified in Class 51, subclass 95: 1,330,981—Donner, issued Feb. 17, 1920.

The above-mentioned patent discloses an arrangement that is similar in its operation to the present invention but it is pointed out that the specific arrangement shown by Donner is more complicated and elaborate than applicant's invention in that it requires a complex and compound shape of cam surface which is suitable only for a particular shape and size of arcuate blade to be ground and for each different size or shape of blade to be ground a different compound cam surface must be provided.

SUMMARY

The grinding machine of applicant's invention requires only a single straight surface inclined cam track which may be easily adjustable to vary its angle of inclination to obtain proper tracking of an arcuate blade segment as it is moved past a grinding surface and, therefore, the same inclined straight edge cam surface may be used for different sizes and shapes of arcuate blades to be ground. More specifically, the grinding machine is provided with a carriage that is movable past a grinding surface and a blade support or jig is pivotally mounted on the carriage to be rotatable about an axis generally parallel to the path of movement of the carriage. A cam follower extends between the blade support and the inclined cam surface which is also positioned in alignment with the path of movement of the carriage past the grinding surface so that as an arcuate blade that is temporarily fixed to the blade support is moved past the grinding surface, the blade support rotates about its axis to maintain a desired angle of grinding contact for the arcuate blade edge with the grinding surface. Simple adjustments are provided for the relative positions of the grinding surface and the movable carriage and the length of the cam follower is also adjustable to vary the rotated angular position of the blade carrier relative to the inclined cam track and thus different sizes and shapes of arcuate blades to be ground may be readily accommodated. In one form of the invention, the pivotal blade support for a predetermined shape of arcuate blade may include spaced apart radial arms extending in planes at right angles to the axis of rotation of the blade support but at different fixed relative angles to each other around the axis of rotation of the blade support. In another form of the invention, the relative angles of each radial arm may be adjustable to enable the same blade support to be used for different respective arcuate blades having respective different helix angles.

BRIEF DESCRIPTION OF THE DRAWINGS

FIG. 1 is a side elevational view of the grinding machine of the invention;

FIG. 2 is a top plan view;

FIG. 3 is an end view as seen to the left of FIG. 1 and with certain parts omitted for clarity of the view as a whole;

DESCRIPTION OF THE PREFERRED EMBODIMENTS

Figure 5:
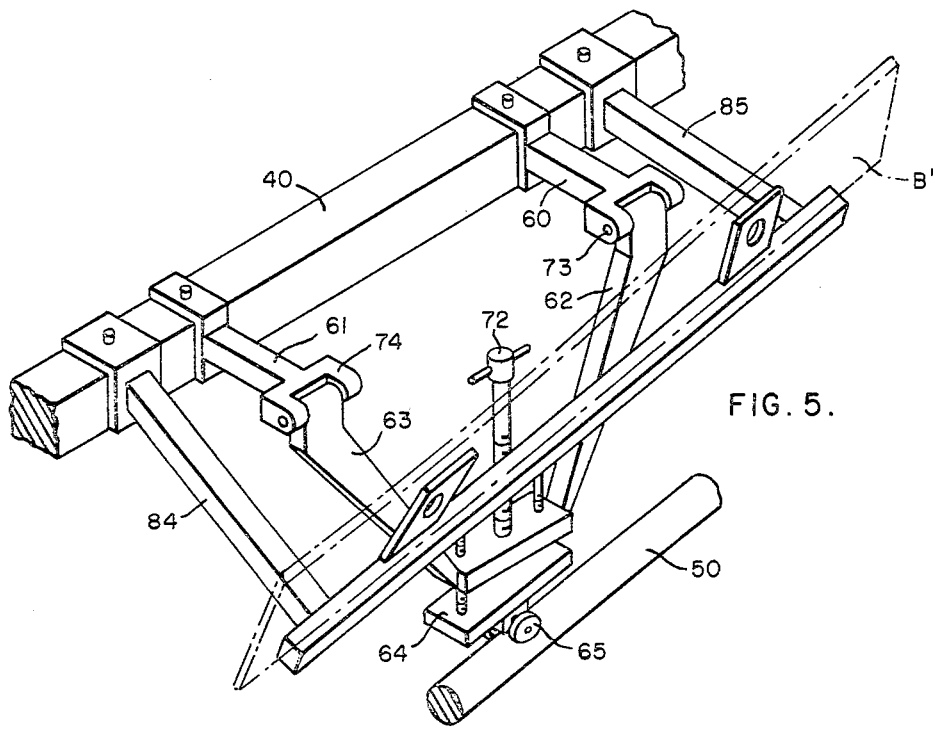
FIG. 5 is an enlarged detailed perspective view of another form of pivotal blade support that may be used with the machine shown by FIGS. 1–3 in place of the blade support of FIG. 4.

Referring first to FIGS. 1–3 of the drawings, the machine is shown to comprise a framework including vertical legs 10–13, upper longitudinal frame members such as shown at 14, 15, 16, upper cross frame members 17, 18 and similar lower members. An adjustable arbor 20 is mounted on the upper frame members 15, 16 and journals the shaft 21 for the grinding wheel 22 having a rotatable grinding surface 23. An electric motor 24 is connected by a belt 25 to rotate the shaft 21 and grinding wheel 22. The arbor 20 may be pivotally adjusted about a vertical axis 26 and secured by means of the wing nuts 27, 28 received in the arcuate slots 29, 30 of the arbor base. The position of the arbor 20 may be adjusted transversely of support rails 15, 16 by means of the rotatable handwheel 31 and threaded shaft 32.

A pair of parallel spaced guide rails 35, 36 are positioned as shown. A movable carriage C is shown to comprise cross members 37, 38 and a longitudinal member 39. Also spanning the carriage cross members 37, 38 is a pivotal arm 40 that is rotatable about an axis generally parallel to the path of movement of the carriage C along the guide rails 35, 36. Roller wheels such as shown at 45–48 are provided to guide the carriage C in its movement on the carriage rails 35, 36 past the grinding wheel surface 23.

A simple straight line inclined cam surface is formed by the pipe rail 50 that is positioned in alignment with the path of movement of the movable carriage C and the particular position of inclination of the cam surface is adjustable by the linkage including the rotatable handles 51, 52, threaded shafts 53, 54 and connecting support links 55, 56. A cam follower comprising radial arms 60, 61, triangularly connected depending arms 62, 63 and universally mounted bridge member 64 with one or more cam follower roller wheels 65, 66 engages the inclined cam surface 50 as shown so that the pivotal arm 40 will pivot about its axis parallel to the path of movement of the carriage C as the carriage is moved past the grinding surface 23 with the cam follower riding the inclined surface 50.

Ordinarily, the weight of the follower mechanism is sufficient to cause it to follow the inclined cam surface track 50 but, if desired, means (not shown) may be provided to keep the cam follower rollers 65, 66 in engagement with the inclined cam track 50 as the carriage C is moved.

It will be noted that the position of one end of the pivotal arm 40 is adjustable transversely of the carriage C by means of the threaded screw 70 while the vertical position of the other end of the pivotal arm 40 is adjustable by means of the threaded shaft handwheel 71 so that a desired position of the pivotal support 40 in the carriage C generally in alignment with the path of movement of the carriage and in predetermined relation to the grinding surface 23 may be obtained.

Figure 4:
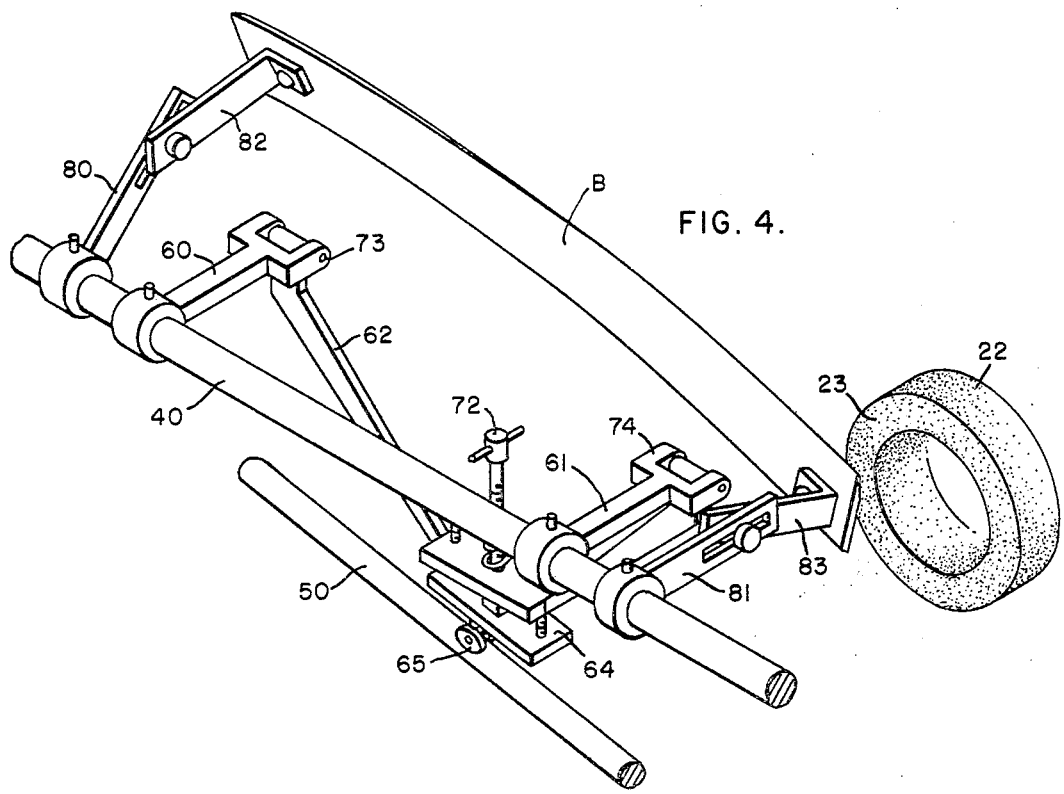
FIG. 4 is an enlarged detailed perspective view of one form of pivotal blade support as shown in FIGS. 1–3.

Referring now to FIGS. 4 and 5 of the drawings, it will be seen that the length of the cam follower including the arms 62, 63 is effectively adjustable by means of the threaded shaft 72 for movably positioning the follower bridge 64 and it will also be noted that the follower arms 62, 63 are pivotally connected at 73, 74 respectively to the radial arms 60, 61 so as to provide the requisite flexible motion of the cam follower as the carriage C is reciprocated. In this connection, it should be pointed out that the carriage C may be manually reciprocated by moving the handle H or motor means (not shown) may be provided to reciprocate the carriage C during a grinding operation.

Referring now to FIG. 4 of the drawings, one form of pivotal blade support including the pivotal arm 40 is shown. Secured to the pivotal arm 40 for rotation therewith are spaced apart radial arms 80, 81 having adjustable end members 82, 83 respectively to which the arcuate blade segment B to be ground may be temporarily attached. It will be noted that the respective angular positions of the radial arms 80, 81 relative to the axis of rotation of the pivotal arm 40 are adjustably different to correspond to the arcuate shape of the particular blade B to be ground.

The type of the blade support shown by FIG. 5 of the drawings differs from that of FIG. 4 in that the relative angles for the radial blade support arms 84 and 85 are fixed for a particular shape of arcuate blade B' and, therefore, the entire pivotal support assembly or jig including the arms 84, 85 must be removed from the pivotal support 40 and a substitute assembly or jig of different radial arm angles must be attached to the support 40 when a different arcuate shape of blade is being ground.

It is believed that the operation of the grinding machine of the invention as described above will be obvious to one skilled in the art and it will be noted that the single straight line inclined cam surface 50 will control the grinding engagement angle for many different shapes of arcuate blades to be ground simply by making the obvious adjustments at 20, 31, 51, 52, 70, 71, 72 and by adjustment of the arms 82, 83 or proper choice of fixed angle pivotal jig with support arms 84, 85. As the carriage C is reciprocated past the grinding surface 23, the arcuate shaped blade B will pivot downward while the cam follower for the pivotal blade support rides down the inclined straight line cam surface 50 and thus the desired grinding angle is maintained along the length of the arcuate blade.

Various modifications will occur to those skilled in the art. For example, the cam surface 50 may be inclined upwards instead of downwards when grinding reversely angled arcuate blades.

What is claimed is:

1. A grinding machine for an arcuately shaped blade comprising a grinding surface, a carriage movable past said grinding surface, a blade support pivotally mounted on said carriage for rotational movement about an axis generally parallel to the path of movement of said carriage, said support including at least two spaced apart radial arms extending in planes at right angles to the pivot axis thereof and at different relative angles to each other around the axis of rotation to correspond to the arcuate shape of a blade to be ground, a substantially straight inclined cam track mounted in alignment with the path of movement of said carriage, and cam follower means secured to said pivotal blade support and engaging said cam track whereby reciprocable movement of said carriage with a blade to be ground affixed to said blade support is effective to move the blade past the grinding surface and simultaneously rotate the blade support as the blade is moved past the grinding surface to thereby maintain a desired grinding angle at the point of engagement of the blade and grinding surface.

2. The invention of claim 1 in which means is provided to adjust the different relative angles of each radial arm to correspond to respective different arcuate shapes of respective different blades to be ground.

3. The invention of claim 1 in which said grinding surface is mounted on an adjustable support to enable the adjustment of the position of the grinding surface relative to the path of movement of said carriage.

4. The invention of claim 1 in which said cam follower is adjustable in length to vary the rotated position of said blade support for a given position of the carriage relative to the cam track.

5. The invention of claim 1 in which adjustable support means for said inclined cam track is provided to enable the adjustment of the angle of inclination for said cam track along the path of movement of said carriage.

6. The invention of claim 1 in which adjusting means is provided for the pivotally mounted blade support axis that is generally parallel to the path of movement of the carriage.

References Cited
UNITED STATES PATENTS

| 197,711 | 11/1877 | Worcester | 51—95 |
| 1,147,214 | 7/1915 | Cross | 51—123 |
| 1,362,239 | 12/1920 | Donner | 51—95 |
| 2,574,110 | 11/1951 | Kopec | 51—95 X |
| 2,585,986 | 2/1952 | Andreasson | 51—123 X |

HAROLD D. WHITEHEAD, Primary Examiner

U.S. Cl. X.R.

51—95, 232